United States Patent [19]

Yamazaki et al.

[11] 4,387,967
[45] Jun. 14, 1983

[54] OPTICAL SYSTEM FOR USE IN SINGLE LENS REFLEX CAMERAS

[75] Inventors: Yasuo Yamazaki, Kawachinagano; Kazuo Kimura; Tetuyuki Tanimoto, both of Sakai, all of Japan

[73] Assignee: Minolta Camera Co., Ltd., Sakai, Japan

[21] Appl. No.: 134,218

[22] Filed: Mar. 26, 1980

[30] Foreign Application Priority Data

Mar. 27, 1979 [JP] Japan .................................. 54-36553

[51] Int. Cl.³ .............................................. G02B 15/00
[52] U.S. Cl. ................................ 350/423; 354/224
[58] Field of Search .............. 350/43, 54, 423, 427; 354/155, 220, 224

[56] References Cited

U.S. PATENT DOCUMENTS 2,913,957 11/1959 Back ..................................... 350/423
3,011,403 12/1961 Dlutzik ................................ 350/43

Primary Examiner—John K. Corbin
Assistant Examiner—Matthew W. Koren
Attorney, Agent, or Firm—Jackson, Jones & Price

[57] ABSTRACT

An optical system for a viewfinder camera is provided. The objective lens system is divided into at least two separate lens groups. The first lens group provides an insufficient correction to aberration while the second lens group is designed specifically to correct the aberration transmitted through the first lens group. The complimentary viewfinder system is also likewise designed to correct the same aberration as the second lens group.

19 Claims, 29 Drawing Figures

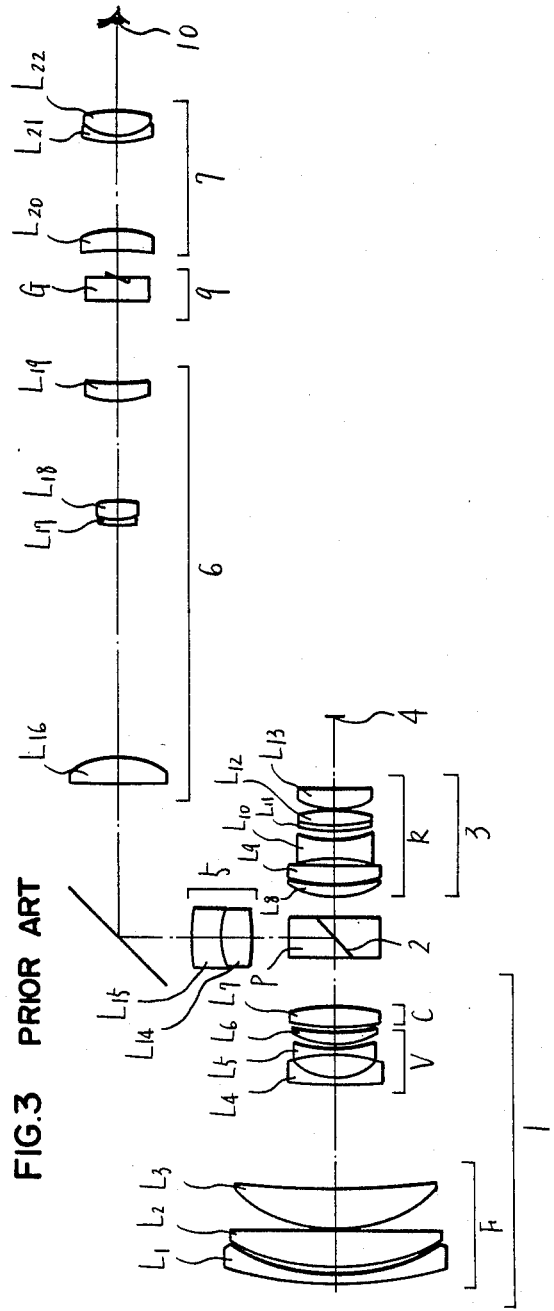
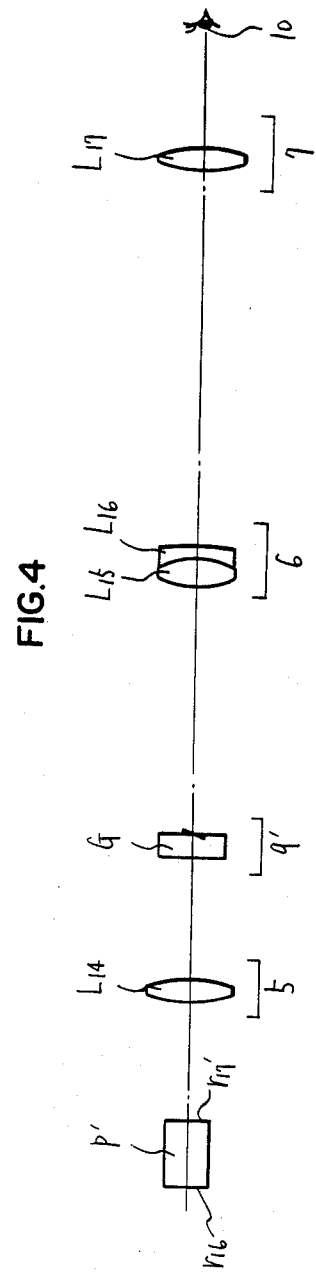
FIG.3 PRIOR ART
FIG.4

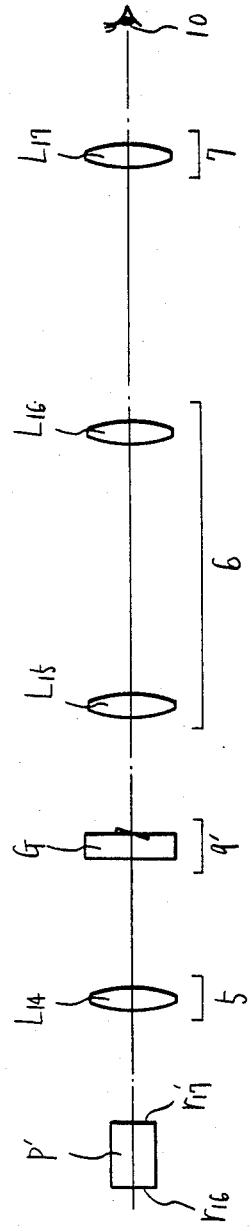
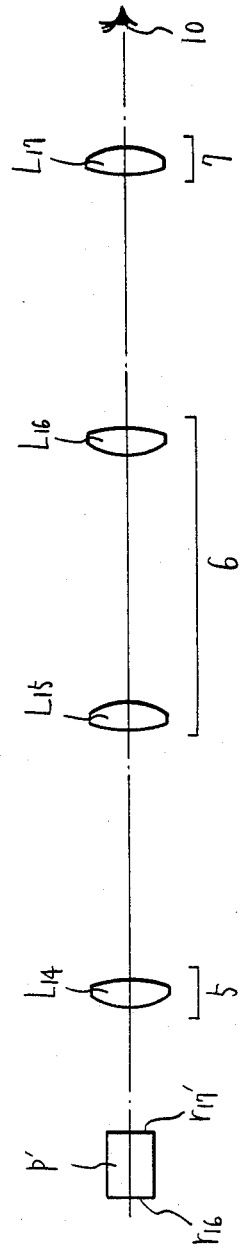

FIG. 9a  FIG. 9b  FIG. 9c  FIG. 9d
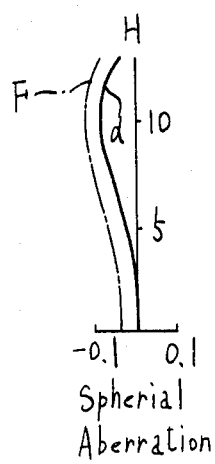
Spherical Aberration
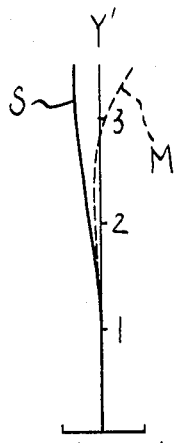
Astigmatism
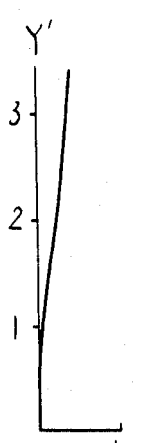
Distortion
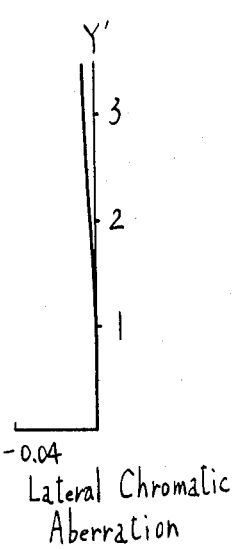
Lateral Chromatic Aberration
FIG. 10a
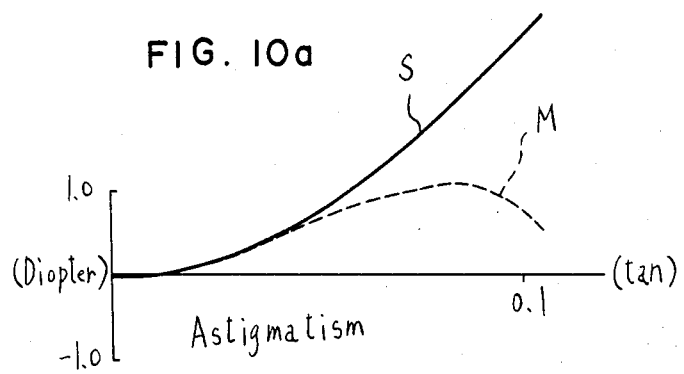
Astigmatism
FIG. 10b
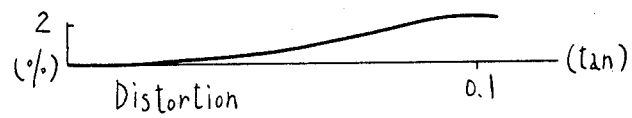
Distortion
FIG. 10c
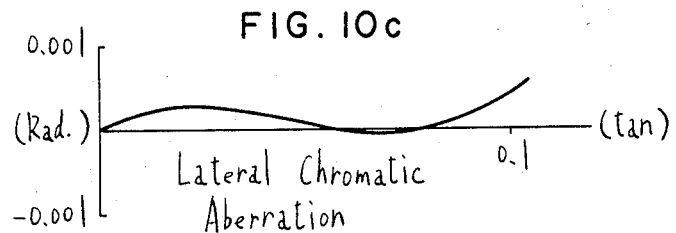
Lateral Chromatic Aberration

OPTICAL SYSTEM FOR USE IN SINGLE LENS REFLEX CAMERAS

BACKGROUND OF THE INVENTION

1. Field of the Invention

The present invention relates to an optical system for use in a single-lens reflex camera, and more particularly, it pertains to a single-lens reflex camera optical system which includes a beam path splitter inside a photographing lens optical system, as in a motion picture camera and a compact single-lens reflex camera, so that a photographer can obtain through a view finder system a light split by the beam path splitter after having passed through a lens group located before the beam path splitter toward an object.

2. Description of the Prior Art

Until now for this type of single-lens reflex camera optical system, a photographing lens optical system, i.e., the most important element of a camera, is first designed to achieve the best corrected aberration to ensure high image forming performance on a film surface. A view finder system is then designed in consideration of aberration conditions of the lens group on the object side of a beam path splitter in the photographing lens optical system so that a favorable finder image can be obtained. As is widely known, however, a view finder system consists mainly of a combination of positive lens elements. This causes the view finder system itself to produce longitudinal aberration when the construction is simplified. Therefore, even if the lens group, located before the beam path splitter, is achromatized, longitudinal chromatic aberration occurs in a finder image on the focal plane. To obtain a favorable finder image accordingly, the longitudinal chromatic aberration must be corrected inside the view finder system, which, as a result, requires a specific number of elements for an achromatic lens, thus causing the entire optical system for a single-lens reflex camera to become a considerably complex lens construction.

U.S. Pat. No. 3,583,785 and U.S. Pat. No. 4,086,000 are cited of general interest.

SUMMARY OF THE INVENTION

The primary object of the present invention is to provide an optical system for use in a single-lens reflex camera, which obviates the above drawback and is simple in optical construction, as a whole.

According to the present invention, both a photographing lens optical system and a view finder optical system are designed in close relationship to each other, the photographing lens optical system being maintained equal in optical construction to the conventional system, while the view finder optical system is simplified, thereby contributing to the simplification of an entire optical system for a single-lens reflex camera.

BRIEF DESCRIPTION OF THE DRAWINGS

FIG. 3 represents a schematic cross sectional view of an exemplary prior art.

FIG. 4 represents a schematic cross sectional view of a part of a second embodiment of the present invention.

FIG. 5 represents a schematic cross sectional view of a part of a third embodiment of the present invention.

FIG. 6 represents a schematic cross sectional view of a part of a fourth embodiment of the present invention.

FIGS. 9a to 9d represent graphic plots of various aberrations of the objective lens system in the exemplary prior art.

FIGS. 10a to 10c represent graphic plots of various aberrations of the finder system in the exemplary prior art.

DETAILED DESCRIPTION OF THE PREFERRED EMBODIMENTS

Figure 1:
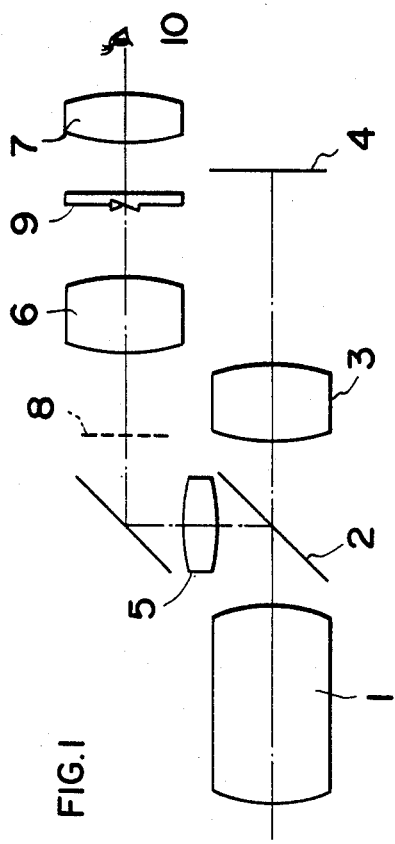
FIG. 1 represents a schematic cross sectional view of an optical system for explaining the concept of the present invention.

Description will now be given of the present invention according to the embodiments shown in the drawings. FIG. 1 shows a schematic view of one embodiment of the present invention for a motion picture camera with a built-in zoom lens system. With reference to FIG. 1, portions 1 and 3 together constitute a photographing lens optical system for focusing an object on a film surface 4. Provided inside the photographing lens optical system is a beam path splitter 2 consisting of a half mirror disposed between a first lens group 1 and a second lens group 3. First lens group 1 consists of a focal zoom lens system which is of the prior art optical construction. However, first lens group 1 sets aberrations according to the features of the present invention so that the longitudinal chromatic aberration may be corrected in excess inside the lens group. This aberration setting is possible by means of the prior art design technique. Second lens group 3 consists of a master lens system. As is well known, the master lens system has a positive refraction which causes longitudinal chromatic aberration to occur inside the system. According to ordinary design, the longitudinal chromatic aberration is corrected therein by using a required number of lens elements for achromatism in the master lens system. According to the features of the present invention, however, the longitudinal chromatic aberration is overcorrected or corrected in excess inside the first lens group 1. This causes the correction excess in the first lens group 1 to offset the longitudinal chromatic aberration occurring in the second lens group 3 which is the master lens system. Therefore, the correction of longitudinal chromatic aberration in the second lens group 3 is eliminated, whereby the number of lens elements required inside the second lens group 3 can be reduced from the conventional system.

According to the present invention, it is natural that longitudinal chromatic aberration is required to be corrected in excess inside the first lens group 1. This causes the first lens group 1 to require a larger number of elements than the conventional system. In other words, the present invention features the entire optical system for a photographing lens wherein the number of elements required for the second lens group 3 of the conventional system has been transferred to the first lens group 1. Therefore, as far as the photographing lens optical system is concerned, the number of elements is equal to the conventional system without any simplification in optical construction. In addition, aberration performance is equal between the photographing lens optical system according to the present invention and the conventional one.

Referring again to FIG. 1, view finder systems are labeled 5, 6 and 7. The light passing through the first lens group 1 which is the zoom lens system in the photographing lens optical system is split by beam path splitter 2 and focused as primary image 8 by objective lens systems having positive refraction. Primary image 8 is further focused on focal plane 9 as a secondary image by erect lens system 6 with positive refraction. A virtual image of the secondary image on focal plane 9 is then observed through eyepiece system 7 by eye 10 of a photographer. As is clear from the foregoing, the optical system up to focal plane 9 in the view finder system consists mainly of a positive lens element combination and longitudinal chromatic aberration occurs in an image on focal plane 9. According to ordinary design, the longitudinal chromatic aberration is corrected inside the view finder system, which must use a required number of lens elements for an image, whose longitudinal chromatic aberration has been corrected, to be focused on focal plane 9. In contrast, according to the features of the present invention, the longitudinal chromatic aberration is corrected in the excess in first lens group 1 of the photographing lens optical system, whereby longitudinal chromatic aberration occurring in positive lens elements 5 and 6 of the view finder system is offset by the correction in excess. Therefore, the correction of longitudinal chromatic aberration occurring in the view finder system lens elements 5 and 6 in relation to an image focused on focal plane 9 is eliminated, whereby the number of lens elements required inside the view finder system can be reduced from the conventional system. Thus, the number of lens elements for the entire optical system for a single-lens reflex camera can be decreased.

Until now a photographing lens optical system and a view finder system are designed independently of each other, and longitudinal chromatic aberrations occurring in the master lens system and view finder system of the photographing lens optical system which is originally the positive lens system are separately corrected in the respective systems. In contrast, the present invention simplifies construction of the entire optical system for a single-lens reflex camera by concentrating the burden of aberration correction on the lens group located before the beam path splitter toward an object.

It should be noted that in FIG. 1, the first lens group 1 is not required to consist of a focal zoom lens system alone and may consist of a combination of the zoom lens system and part of the lens elements in the master lens system next to the zoom lens system. In this case, beam path splitter 2 is arranged inside the master lens system. In addition, if beam path splitter 2 is a movable mirror replaced for a half mirror, the embodiment in FIG. 1 may be used as an optical system for a compact still camera. It is to be understood that although description was made of longitudinal chromatic aberration alone, the technological concept of the present invention is, needless to say, applicable to other aberrations.

Figure 2:
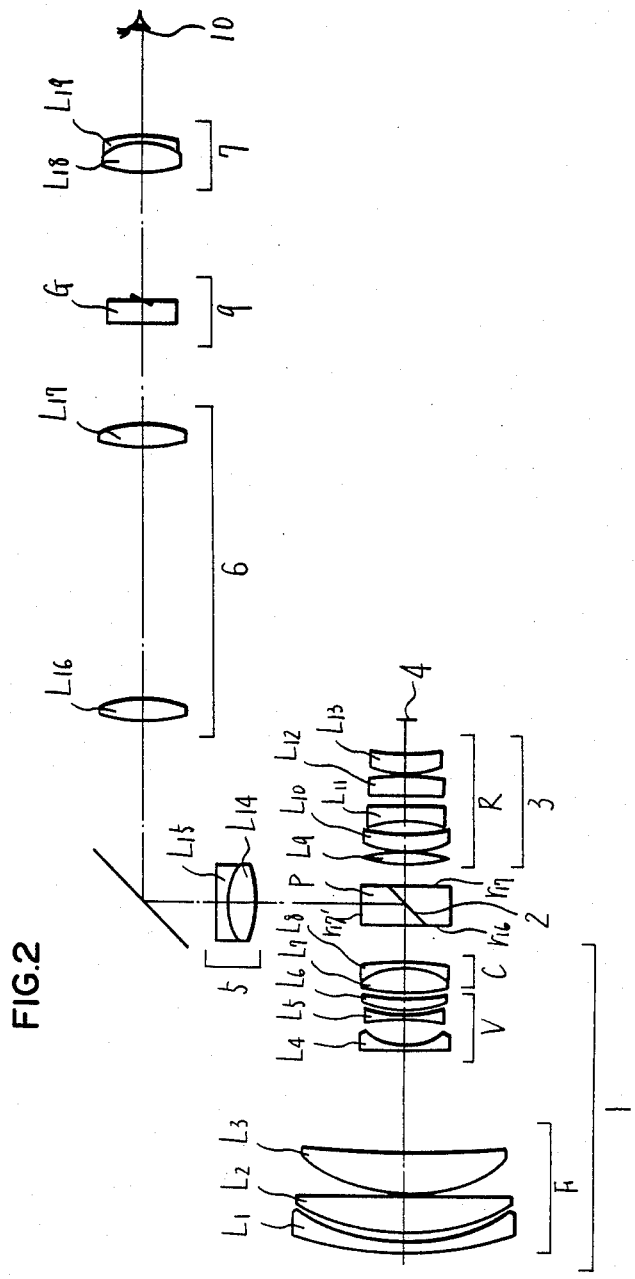
FIG. 2 represents a schematic cross sectional view of a first embodiment of the present invention.
Figures 7A, 7B, 7C, 7D:
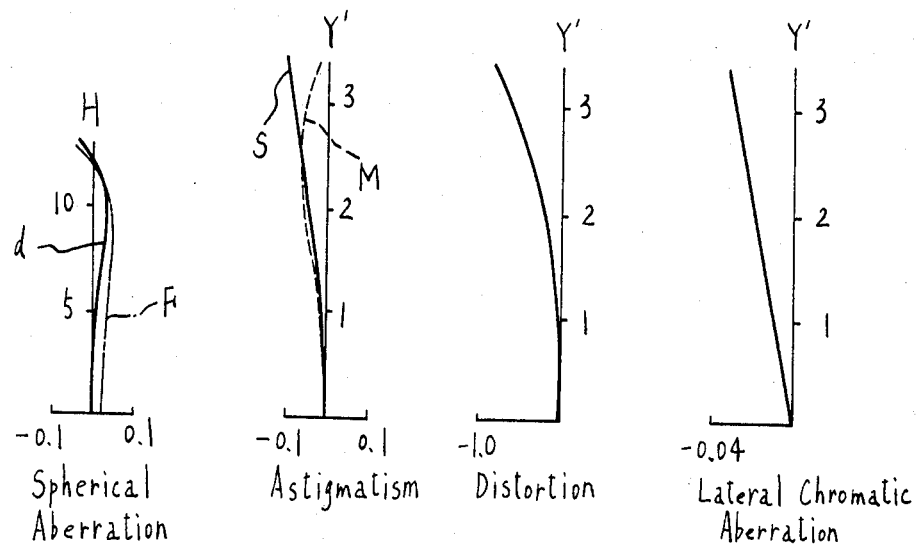
FIGS. 7a to 7d represents graphic plots of various aberrations of the objective lens system in the first embodiment.
Figure 8A:
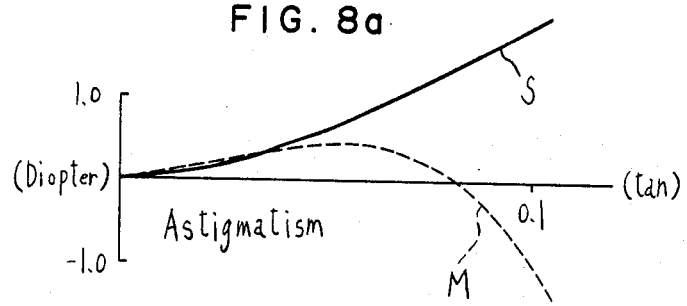
FIGS. 8a to 8c represent graphic plots of various aberrations of the finder system in the first embodiment.
Figure 8B:
Figure 8C:
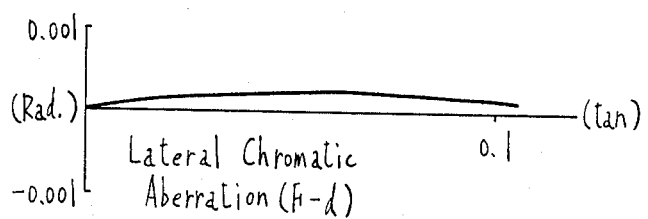
Figure 11A:
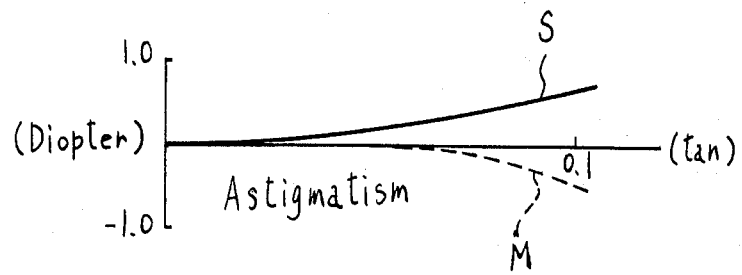
FIGS. 11a to 11c represent graphic plots of various aberrations of the finder system in the second embodiment.
Figure 11B:
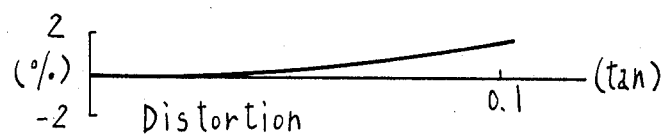
Figure 11C:
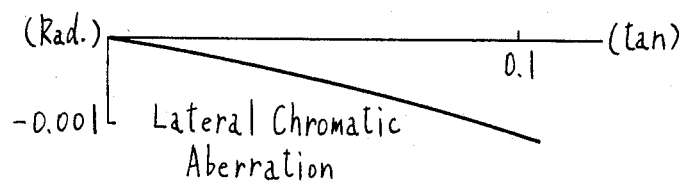
Figure 12A:
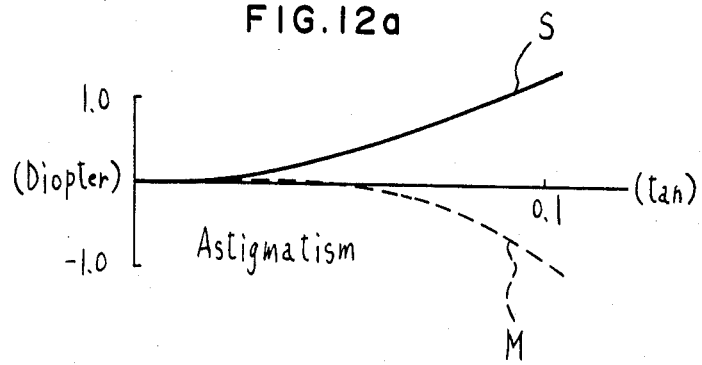
FIGS. 12a to 12c represent graphic plots of various aberrations of the finder system in the third embodiment.
Figure 12B:
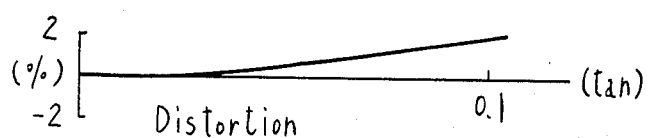
Figure 12C:
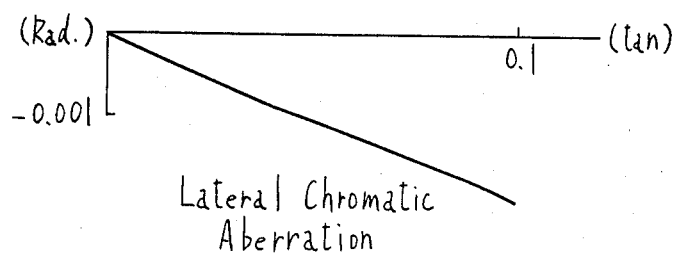
Figure 13A:
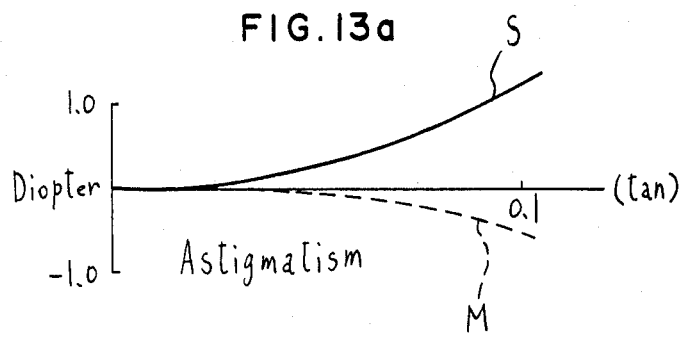
FIGS. 13a to 13c represent graphic plots of various aberrations of the finder system in the fourth embodiment.
Figure 13B:
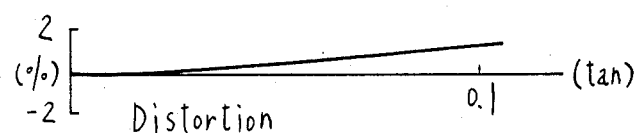
Figure 13C:
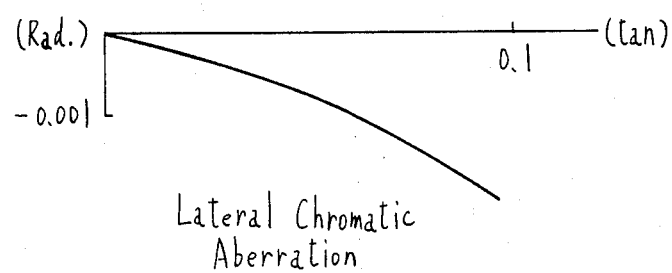

FIG. 2 shows a first embodiment of the present invention. Objective lens system is constructed by an object side part 1 and an image side part 3, an image forming light path being passed through the object side and image side parts 1 and 3 toward image 4. The image forming light path is branched between the object side part 1 and the image side part 3 by semitransparent mirror 2 of the prism P. The branched light path is received by a branch optical system including elements 5, 6, 9 and 7, which forms a finder system in combination with the object side part 1 of the objective lens system. The front lens group 5 serves as an objective of the branch optical system, and the intermediate lens group 6 serves as an erecting system for converting the inverted primary real image formed by the front lens group 5 into an erecting secondary real image on the reticle at the eye side of the focusing plate 9. Finally, the rear lens group 7 serves as an ocular for watching the image on the reticle.

Table 1-L shows a lens construction of the objective lens system along the light path from an object to the image 4 in FIG. 2. Table 1-F shows a lens construction of the finder system along the light path from an object to the eye 10 in FIG. 2.

TABLE 1-L (Embodiment 1-L)
$f = 33.00$  $F_{No.} = 1.26$  $2 = 12°$  $L.B = 5.68$

| | | Radius of Curvature | | Axial Distance | | Refractive Index | | Abbe Number |
|---|---|---|---|---|---|---|---|---|
| $L_1$ | ( | $r_1$ | 78.512 | $d_1$ | 1.5 | $N_1$ | 1.80518 $\nu_1$ | 25.43 |
| | | $r_2$ | 33.152 | $d_2$ | 1.5 | | | |
| $L_2$ | ( | $r_3$ | 38.724 | $d_3$ | 6.2 | $N_2$ | 1.64050 $\nu_2$ | 60.08 |
| | | $r_4$ | ∞ | $d_4$ | 0.1 | | | |
| $L_3$ | ( | $r_5$ | 26.281 | $d_5$ | 6.9 | $N_3$ | 1.64050 $\nu_3$ | 60.08 |
| | | $r_6$ | 169.775 | $d_6$ | 17.7 | | | |
| $L_4$ | ( | $r_7$ | 123.964 | $d_7$ | 1.0 | $N_4$ | 1.64050 $\nu_4$ | 60.08 |
| | | $r_8$ | 9.026 | $d_8$ | 4.4 | | | |
| $L_5$ | ( | $r_9$ | −30.992 | $d_9$ | 0.9 | $N_5$ | 1.56873 $\nu_5$ | 63.1 |
| | | $r_{10}$ | 22.881 | $d_{10}$ | 0.6 | | | |
| $L_6$ | ( | $r_{11}$ | 17.214 | $d_{11}$ | 2.2 | $N_6$ | 1.80518 $\nu_6$ | 25.43 |
| | | $r_{12}$ | 39.676 | $d_{12}$ | 0.8 | | | |
| $L_7$ | ( | $r_{13}$ | 28.000 | $d_{13}$ | 4.2 | $N_7$ | 1.62041 $\nu_7$ | 60.29 |
| | | $r_{14}$ | −13.300 | $d_{14}$ | 1.0 | $N_8$ | 1.73300 $\nu_8$ | 28.24 |
| $L_8$ | | $r_{15}$ | −64.057 | $d_{15}$ | 6.3 | | | |
| P | ( | $r_{16}$ | ∞ | $d_{16}$ | 7.0 | $N_9$ | 1.62588 $\nu_9$ | 35.70 |
| | | $r_{17}$ | ∞ | $d_{17}$ | 3.5 | | | |
| $L_9$ | ( | $r_{18}$ | 26.419 | $d_{18}$ | 2.0 | $N_{10}$ | 1.64050 $\nu_{10}$ | 60.08 |
| | | $r_{19}$ | −39.539 | $d_{19}$ | 0.2 | | | |
| $L_{10}$ | ( | $r_{20}$ | 20.518 | $d_{20}$ | 3.5 | $N_{11}$ | 1.62135 $\nu_{11}$ | 61.28 |
| | | $r_{21}$ | 71.826 | $d_{21}$ | 1.5 | | | |
| $L_{11}$ | ( | $r_{22}$ | −26.604 | $d_{22}$ | 3.0 | $N_{12}$ | 1.74000 $\nu_{12}$ | 28.26 |
| | | $r_{23}$ | −168.070 | $d_{23}$ | 1.5 | | | |
| | | $r_{24}$ | −974.393 | $d_{24}$ | 3.6 | | | |

TABLE 1-L-continued (Embodiment 1-L)

f = 33.00    $F_{No.}$ = 1.26    2ω = 12°    L.B = 5.68

| | Radius of Curvature | | Axial Distance | Refractive Index | | Abbe Number |
|---|---|---|---|---|---|---|
| $L_{12}$ | $r_{25}$ −73.788 | $d_{25}$ | 0.2 | $N_{13}$ | 1.64050 $\nu_{13}$ | 60.08 |
| $L_{13}$ | $r_{26}$ 19.202 | $d_{26}$ | 3.5 | $N_{14}$ | 1.64050 $\nu_{14}$ | 60.08 |
| | $r_{27}$ 39.469 | | | | | |

TABLE 1-F (Embodiment 1-F)

(f = 33.00)    Diopter = 0.0    Magnification = 2.33

| | Radius of Curvature | | Axial Distance | Refractive Index | | Abbe Number |
|---|---|---|---|---|---|---|
| $L_1$ | $r_1$ 78.512 | $d_1$ | 1.5 | $N_1$ | 1.80518 $\nu_1$ | 25.43 |
| | $r_2$ 33.152 | $d_2$ | 1.5 | | | |
| $L_2$ | $r_3$ 38.724 | $d_3$ | 6.2 | $N_2$ | 1.64050 $\nu_2$ | 60.08 |
| | $r_4$ ∞ | $d_4$ | 0.1 | | | |
| $L_3$ | $r_5$ 26.281 | $d_5$ | 6.9 | $N_3$ | 1.64050 $\nu_3$ | 60.08 |
| | $r_6$ 169.775 | $d_6$ | 17.7 | | | |
| $L_4$ | $r_7$ 123.964 | $d_7$ | 1.0 | $N_4$ | 1.64050 $\nu_4$ | 60.08 |
| | $r_8$ 9.026 | $d_8$ | 4.4 | | | |
| $L_5$ | $r_9$ −30.992 | $d_9$ | 0.9 | $N_5$ | 1.56873 $\nu_5$ | 63.1 |
| | $r_{10}$ 22.881 | $d_{10}$ | 0.6 | | | |
| $L_6$ | $r_{11}$ 17.214 | $d_{11}$ | 2.2 | $N_6$ | 1.80518 $\nu_6$ | 25.43 |
| | $r_{12}$ 39.676 | $d_{12}$ | 0.8 | | | |
| $L_7$ | $r_{13}$ 28.000 | $d_{13}$ | 4.2 | $N_7$ | 1.62041 $\nu_7$ | 60.29 |
| | $r_{14}$ −13.300 | $d_{14}$ | 1.0 | $N_8$ | 1.73300 $\nu_8$ | 28.24 |
| $L_8$ | $r_{15}$ −64.057 | $d_{15}$ | 6.3 | | | |
| P' | $r_{16}$ ∞ | $d_{16'}$ | 11.5 | $N_9$ | 1.62588 $\nu_9$ | 35.70 |
| | $r_{17'}$ ∞ | $d_{27}$ | 18.0 | | | |
| $L_{14}$ | $r_{28}$ 17.000 | $d_{28}$ | 5.0 | $N_{15}$ | 1.62041 $\nu_{15}$ | 60.29 |
| | $r_{29}$ −11.000 | $d_{29}$ | 2.0 | $N_{16}$ | 1.73300 $\nu_{16}$ | 28.24 |
| $L_{15}$ | $r_{30}$ −69.700 | $d_{30}$ | 43.2 | | | |
| $L_{16}$ | $r_{31}$* 20.000 | $d_{31}$ | 4.0 | $N_{17}$ | 1.49140 $\nu_{17}$ | 57.9 |
| | $r_{32}$* −20.000 | $d_{32}$ | 42.3 | | | |
| $L_{17}$ | $r_{33}$* 20.000 | $d_{33}$ | 4.0 | $N_{18}$ | 1.49140 $\nu_{18}$ | 57.9 |
| | $r_{34}$* −20.000 | $d_{34}$ | 16.9 | | | |
| G | $r_{35}$ ∞ | $d_{35}$ | 4.0 | $N_{19}$ | 1.49140 $\nu_{19}$ | 57.9 |
| | $r_{36}$ ∞ | $d_{36}$ | 21.1 | | | |
| $L_{18}$ | $r_{37}$ 25.700 | $d_{37}$ | 5.0 | $N_{20}$ | 1.62041 $\nu_{20}$ | 60.29 |
| | $r_{38}$ −10.500 | $d_{38}$ | 1.0 | $N_{21}$ | 1.73300 $\nu_{21}$ | 28.24 |
| $L_{19}$ | $r_{39}$ −23.000 | $d_{39}$ | 18.0 | | | |
| | Eye Point | | | | | |

*ε = −1.35, Σ $Ci\phi^{2i}$ = 0

Between Tables 1-L and 1-F, the construction from $r_1$ to $r_{15}$ is identical with each other. Further, prism P in Table 1-L is substantially identical with prism P' in Table 1-F, except for the effective thickness, i.e., $r_1$ to $r_{17}$ in case of Table 1-L, and $r_{16}$ to $r'_{17}$ in case of Table 1-F, which difference is caused by the light path branching from the semitransparent mirror 2.

According to Table 1-L or 1-F, the object side part 1, i.e., the lens construction from $r_1$ to $r_{15}$, shows an excessive correction of longitudinal chromatic aberration of F-line to d-line, −0.43 diopter, in terms of finder. On the contrary, the final longitudinal chromatic aberration of F-line to d-line of the whole objective lens system at film 4 is +0.026 mm. This means that the excessive correction of longitudinal chromatic aberration in the object side part 1 is cancelled with the undercorrected or insufficient correction of the same in the image side part 3.

On the other hand, the branch optical system 5 to 7 in the finder system has an undercorrected insufficiently corrected longitudinal chromatic aberration of F-line to d-line, +0.55 diopter, by itself. This insufficient correction of longitudinal chromatic aberration is cancelled with the excessive correction of the same in the object side part 1 of the objective lens system, and the longitudinal chromatic aberration of F-line to d-line of the whole finder system, i.e., the object side part 1 plus the branch optical system, is −0.07 diopter. In addition, the longitudinal chromatic aberration of F-line to d-line of the whole finder system at the reticle of focusing plate 9 is +0.030 mm.

According to the general requirement for an objective lens system, the absolute value for the longitudinal chromatic aberration of F-line to d-line should be less than about 0.07 mm. The objective lens system of the present invention fulfills this requirement as a whole lens system and also has a characteristic image side part 3 of an insufficiently corrected longitudinal chromatic aberration to be cancelled with the excessive correction of the same in the image side part 1. The degree of the insufficiency of the correction for the longitudinal chromatic aberration in the image side part 3 thus characterizes the present invention, i.e., the absolute value for the insufficient correction of the longitudinal chromatic aberration of F-line to d-line of the image side part 3 is greater than 0.0004 $f_R$ according to the present invention, wherein $f_R$ represents the focal length of the image side part 3.

In other words, the present invention is also characterized by the absolute value of the excessive correction of longitudinal chromatic aberration of F-line to d-line in the object side part 1 of the objective lens system, which absolute value is greater than 0.3 diopter in terms of finder. In case of the embodiment in FIG. 2, such an excessive correction for longitudinal chromatic aberration is mainly caused by the doublet composed of lens elements $L_7$ and $L_8$.

The ocular, or the rear lens group, 7 of the branch optical system in FIG. 2 adopts a doublet for correcting the chromatic aberration, which would otherwise occur at the ocular itself, to prevent the blue coloration of the inner edge of the finder frame. Another doublet is also adopted as the objective, or the front lens group, 5 of the branch optical system. The pair of doublets 5 and 7 make the branch optical system symmetric to prevent the occurrence of lateral chromatic aberration in the finder image.

In the erecting system 6 of the branch optical system, a pair of identically shaped single lenses are adopted, each of the single lenses being a symmetric lens formed by aspherical surfaces to correct the field curvature of the finder image. In Table 1-F, the aspherical surface is indicated by a star (*), e.g., $r_{31}*$, and the necessary information of the aspherical surface are given at the bottom of Table 1-F. An aspherical surface is generally given by the following formula:

$$\chi = \frac{C_0\phi^2}{1 + (1 - \epsilon C_0\phi^2)^{\frac{1}{2}}} + \Sigma_i C_i \phi^{2i}, \quad (1)$$

Wherein
$C_0$ represents the radius of curvature of the aspherical surface at the optical axis,
$\phi$ represents the distance from the optical axis,
$\chi$ represents the displacement of the aspherical surface from the spherical surface of radius of curvature $C_0$ in the direction of the optical axis,
and $\epsilon$ and $C_i$ represent various coefficients for determining the aspherical surface.

Table 1-F shows that all aspherical surfaces $r_{31}*$ to $r_{34}*$ are identical, and $\epsilon$ is $-1.35$ and $C_1, C_2, C_3$ - - - are all zero in the above formula (1).

By the way, the identical aspherical surface can be given by another expression when $C_1, C_2, C_3$ - - - are all zero in the formula (1), the expression being:

$$\left.\begin{array}{l}\chi = \dfrac{C_0\phi^2}{1 + (1 - C_0\phi^2)^{\frac{1}{2}}} + \Sigma_i C_i \phi^{2i}, \\ \text{wherein, } C_1 = 0 \\ \quad C_2 = 1/8\, C_0^3 (\epsilon - 1), \\ \quad C_3 = 1/16\, C_0^5 (\epsilon^2 - 1), \text{ and} \\ \quad C_4 = 5/128\, C_0^7 (\epsilon^3 - 1) \text{ etc.}\end{array}\right\} \quad (2)$$

Thus, the aspherical surfaces of Table 1-F can also be expressed in a form that $\Sigma_i C_i \phi^{2i}$ is not zero.

The above explanation for the expression of the aspherical surface can be applied to other embodiments of the present invention, and further explanation will be omitted.

As already mentioned, in the branch optical system of FIG. 2, the longitudinal chromatic aberration is left in an insufficiently corrected condition to avoid any addition of further lens elements and to simplify the lens construction of the branch optical system.

FIGS. 7a to 7d represent the various aberrations of the lens system of the first embodiment in FIG. 2, and FIGS. 8a to 8c correspond to those for the finder system. These figures prove that the first embodiment in FIG. 2 is a highly useful and practical system.

FIG. 3 shows an exemplary prior art, the lens construction of the objective lens system and the finder system being shown in Tables 2-L and 2-F, respectively.

TABLE 2-L (Exemplary Prior Art - L)
f = 33.00　　$F_{No.}$ = 1.26　　2 = 12°　　L.B. = 12.29

| | | Radius of Curvature | Axial Distance | | Refractive Index | | Abbe Number |
|---|---|---|---|---|---|---|---|
| $L_1$ | $r_1$ | 78.512 | $d_1$ | 1.5 | $N_1$　1.80518 | $\nu_1$ | 25.43 |
| | $r_2$ | 33.152 | $d_2$ | 1.5 | | | |
| $L_2$ | $r_3$ | 38.724 | $d_3$ | 6.2 | $N_2$　1.64050 | $\nu_2$ | 60.08 |
| | $r_4$ | ∞ | $d_4$ | 0.1 | | | |
| | $r_5$ | 26.281 | $d_5$ | 6.9 | | | |

TABLE 2-L-continued (Exemplary Prior Art - L)
f = 33.00　　$F_{No.}$ = 1.26　　2 = 12°　　L.B. = 12.29

| | | Radius of Curvature | Axial Distance | | Refractive Index | | Abbe Number |
|---|---|---|---|---|---|---|---|
| $L_3$ | $r_6$ | 169.775 | $d_6$ | 17.7 | $N_3$　1.64050 | $\nu_3$ | 60.08 |
| $L_4$ | $r_7$ | 123.964 | $d_7$ | 1.0 | $N_4$　1.64050 | $\nu_4$ | 60.08 |
| | $r_8$ | 9.026 | $d_8$ | 4.4 | | | |
| $L_5$ | $r_9$ | −30.992 | $d_9$ | 0.9 | $N_5$　1.56873 | $\nu_5$ | 63.10 |
| | $r_{10}$ | 22.881 | $d_{10}$ | 0.6 | | | |
| $L_6$ | $r_{11}$ | 17.214 | $d_{11}$ | 2.2 | $N_6$　1.80518 | $\nu_6$ | 25.43 |
| | $r_{12}$ | 39.676 | $d_{12}$ | 0.8 | | | |
| $L_7$ | $r_{13}$ | 50.653 | $d_{13}$ | 3.2 | $N_7$　1.70030 | $\nu_7$ | 47.67 |
| | $r_{14}$ | −62.704 | $d_{14}$ | 8.3 | | | |
| P | $r_{15}$ | ∞ | $d_{15}$ | 7.0 | $N_8$　1.62588 | $\nu_8$ | 35.70 |
| | $r_{16}$ | ∞ | $d_{16}$ | 3.5 | | | |
| $L_8$ | $r_{17}$ | 15.872 | $d_{17}$ | 2.0 | $N_9$　1.64050 | $\nu_9$ | 60.08 |
| | $r_{18}$ | 36.085 | $d_{18}$ | 0.1 | | | |
| $L_9$ | $r_{19}$ | 30.865 | $d_{19}$ | 3.3 | $N_{10}$　1.62135 | $\nu_{10}$ | 61.28 |
| | $r_{20}$ | 155.809 | $d_{20}$ | 1.1 | | | |
| $L_{10}$ | $r_{21}$ | −22.817 | $d_{21}$ | 3.0 | $N_{11}$　1.74000 | $\nu_{11}$ | 28.26 |
| | $r_{22}$ | 16.622 | $d_{22}$ | 1.6 | | | |
| $L_{11}$ | $r_{23}$ | 36.602 | $d_{23}$ | 0.8 | $N_{12}$　1.67270 | $\nu_{12}$ | 32.22 |
| | $r_{24}$ | 24.764 | $d_{24}$ | 2.8 | | | |
| $L_{12}$ | $r_{25}$ | −17.259 | $d_{25}$ | 0.1 | $N_{13}$　1.67790 | $\nu_{13}$ | 55.38 |
| $L_{13}$ | $r_{26}$ | 16.271 | $d_{26}$ | 3.5 | $N_{14}$　1.64050 | $\nu_{14}$ | 60.08 |
| | $r_{27}$ | 685.641 | | | | | |

TABLE 2-F (Exemplary Prior Art - F)
(f = 33.00)　　Diopter = 0.0　　Magnification = 2.43

| | | Radius of Curvature | Axial Distance | | Refractive Indent | | Abbe Number |
|---|---|---|---|---|---|---|---|
| $L_1$ | $r_1$ | 78.512 | $d_1$ | 1.5 | $N_1$　1.80518 | $\nu_1$ | 25.43 |
| | $r_2$ | 33.152 | $d_2$ | 1.5 | | | |
| $L_2$ | $r_3$ | 38.724 | $d_3$ | 6.2 | $N_2$　1.64050 | $\nu_2$ | 60.08 |
| | $r_4$ | ∞ | $d_4$ | 0.1 | | | |
| $L_3$ | $r_5$ | 26.281 | $d_5$ | 6.9 | $N_3$　1.64050 | $\nu_3$ | 60.08 |
| | $r_6$ | 169.775 | $d_6$ | 17.7 | | | |
| $L_4$ | $r_7$ | 123.964 | $d_7$ | 1.0 | $N_4$　1.64050 | $\nu_4$ | 60.08 |
| | $r_8$ | 9.026 | $d_8$ | 4.4 | | | |
| $L_5$ | $r_9$ | −30.992 | $d_9$ | 0.9 | $N_5$　1.56873 | $\nu_5$ | 63.1 |
| | $r_{10}$ | 22.881 | $d_{10}$ | 0.6 | | | |
| $L_6$ | $r_{11}$ | 17.214 | $d_{11}$ | 2.2 | $N_6$　1.80518 | $\nu_6$ | 25.43 |
| | $r_{12}$ | 39.676 | $d_{12}$ | 0.8 | | | |
| | $r_{13}$ | 50.653 | $d_{13}$ | 3.2 | | | |

TABLE 2-F-continued (Exemplary Prior Art - F)
(f = 33.00)   Diopter = 0.0   Magnification = 2.43

| | Radius of Curvature | | Axial Distance | | Refractive Index | | Abbe Number |
|---|---|---|---|---|---|---|---|
| $L_7$ | $r_{14}$ | −62.704 | $d_{14}$ | 8.3 | $N_7$ 1.70030 | $\nu_7$ | 47.67 |
| P' | $r_{15}$ | ∞ | $d_{15'}$ | 11.5 | $N_8$ 1.62588 | $\nu_8$ | 35.70 |
| | $r_{16'}$ | ∞ | $d_{27}$ | 6.8 | | | |
| $L_{14}$ | $r_{28}$ | 45.455 | $d_{28}$ | 5.3 | $N_{15}$ 1.62280 | $\nu_{15}$ | 56.98 |
| | $r_{29}$ | −9.823 | $d_{29}$ | 5.0 | | | |
| $L_{15}$ | $r_{30}$ | −29.147 | $d_{30}$ | 38.9 | $N_{16}$ 1.68300 | $\nu_{16}$ | 31.52 |
| $L_{16}$ | $r_{31}$ | −687.999 | $d_{31}$ | 4.5 | $N_{17}$ 1.49140 | $\nu_{17}$ | 57.9 |
| | $r_{32}$ | −14.000 | $d_{32}$ | 39.2 | | | |
| $L_{17}$ | $r_{33}$ | 30.682 | $d_{33}$ | 1.0 | $N_{18}$ 1.73300 | $\nu_{18}$ | 28.24 |
| | $r_{34}$ | 9.700 | $d_{34}$ | 3.0 | | | |
| $L_{18}$ | $r_{35}$ | −26.234 | $d_{35}$ | 17.0 | $N_{19}$ 1.62280 | $\nu_{19}$ | 56.98 |
| $L_{19}$ | $r_{36}$ | 16.227 | $d_{36}$ | 3.0 | $N_{20}$ 1.49140 | $\nu_{20}$ | 57.9 |
| | $r_{37}$ | 211.100 | $d_{37}$ | 13.4 | | | |
| G | $r_{38}$ | ∞ | $d_{38}$ | 4.0 | $N_{21}$ 1.49140 | $\nu_{21}$ | 57.9 |
| | $r_{39}$ | ∞ | $d_{39}$ | 4.7 | | | |
| $L_{20}$ | $r_{40}$ | −51.853 | $d_{40}$ | 4.0 | $N_{22}$ 1.49140 | $\nu_{22}$ | 57.9 |
| | $r_{41}$ | −13.925 | $d_{41}$ | 14.4 | | | |
| $L_{21}$ | $r_{42}$ | 21.598 | $d_{42}$ | 1.0 | $N_{23}$ 1.73300 | $\nu_{23}$ | 28.24 |
| | $r_{43}$ | 8.311 | $d_{43}$ | 4.3 | | | |
| $L_{22}$ | $r_{44}$ | −31.397 | $d_{44}$ | 15.0 | $N_{24}$ 1.62280 | $\nu_{24}$ | 56.98 |
| | Eye Point | | | | | | |

In the exemplary prior art, the objective lens system is conventionally designed, i.e., the longitudinal chromatic aberration (F-line to d-line) in the object side part 1 is +0.23 diopter in terms of finder, and the final longitudinal chromatic aberration (F to d) in the whole objective lens system at film 4 is −0.043 mm. This means that the inherent longitudinal chromatic aberration of the image side part 3 is sufficiently corrected within the image side part 3 by itself. In case of the exemplary prior art, such a correction is mainly due to the doublet composed of $L_{11}$ and $L_{12}$.

As apparent from the comparison between the first embodiment of the present invention and the exemplary prior art, the final longitudinal chromatic aberration at film 4 is substantially of the same degree and the number of lens elements required to construct the objective lens system is identical with each other. Therefore, the objective lens system of the present invention is equivalent to the prior art as far as the final result with which the objective lens system by itself is concerned.

However, any simplified branch optical system such as in FIG. 2 cannot be combined with the objective lens system of the exemplary prior art in FIG. 3. The longitudinal chromatic aberration is left in an insufficiently corrected condition in the branch optical system of FIG. 2, and this insufficient correction would not be improved by any means and would remain in the final image in case of a finder system made by combining the simplified branch optical system of FIG. 2 with the conventional object side part 1 of FIG. 3.

Therefore, the exemplary prior art in FIG. 3 inevitably adopts a branch optical system in which the number of elements is increased to correct the inherent longitudinal chromatic aberration of the branch optical system by itself. According to Table 2-F, the longitudinal chromatic aberration (F-d) of the branch optical system by itself is −0.39 diopter, and the longitudinal chromatic aberration (F-d) of the whole finder system is −0.023 diopter. In addition, the longitudinal chromatic aberration (F-d) of the whole finder system at the reticle of focusing plate 9 is −0.049 mm. FIGS. 9a to 9d and 10a to 10c show various other aberrations of the exemplary prior art.

As apparent from the above comparison, the present invention successfully provides an optical system for use in single lens reflex cameras in which the construction of the whole system is simplified with necessary aberration corrections sufficiently achieved.

FIGS. 4 to 6 show finder systems of second to fourth embodiments of the present invention, Tables 3 to 5 corresponding to the second to fourth embodiments, respectively.

TABLE 3

(Embodiment 2)
(f = 33.00)   Diopter = 0.0   Magnification = 1.75

| | Radius of Curvature | | Axial Distance | | Refractive Index | | Abbe Number |
|---|---|---|---|---|---|---|---|
| P' | $r_{16}$ | ∞ | $d_{16'}$ | 11.5 | $N_9$ 1.62588 | $\nu_9$ | 35.70 |
| | $r_{17'}$ | ∞ | $d_{27}$ | 22.0 | | | |
| $L_{14}$ | $r_{28}*$ | 20.000 | $d_{28}$ | 4.0 | $N_{15}$ 1.49140 | $\nu_{15}$ | 57.9 |
| | $r_{29}*$ | −20.000 | $d_{29}$ | 17.0 | | | |
| G | $r_{30}$ | ∞ | $d_{30}$ | 4.0 | $N_{16}$ 1.49140 | $\nu_{16}$ | 57.9 |
| | $r_{31}$ | ∞ | $d_{31}$ | 58.0 | | | |
| $L_{15}$ | $r_{32}$ | 27.000 | $d_{32}$ | 3.0 | $N_{17}$ 1.61762 | $\nu_{17}$ | 52.70 |
| $L_{16}$ | $r_{33}$ | −10.700 | $d_{33}$ | 1.0 | $N_{18}$ 1.73300 | $\nu_{18}$ | 28.24 |
| | $r_{34}$ | −30.000 | $d_{34}$ | 71.3 | | | |
| $L_{17}$ | $r_{35}*$ | 20.000 | $d_{35}$ | 4.0 | $N_{19}$ 1.49140 | $\nu_{19}$ | 57.9 |
| | $r_{36}*$ | −20.000 | $d_{36}$ | 27.0 | | | |
| | Eye Point | | | | | | |

*ε = −1.25, $\sum_i C_i \phi^{2i} = 0$

TABLE 4

(Embodiment 3)
(f = 33.00)   Diopter = 0.0   Magnification = 1.94

| | Radius of Curvature | | Axial Distance | | Refractive Index | | Abbe Number |
|---|---|---|---|---|---|---|---|
| P' | $r_{16}$ | ∞ | $d_{16'}$ | 11.5 | $N_9$ 1.62588 | $\nu_9$ | 35.70 |
| | $r_{17'}$ | ∞ | $d_{27}$ | 18.0 | | | |
| $L_{14}$ | $r_{28}*$ | 20.000 | $d_{28}$ | 4.0 | $N_{15}$ 1.49140 | $\nu_{15}$ | 57.9 |
| | $r_{29}*$ | −20.000 | $d_{29}$ | 16.8 | | | |
| G | $r_{30}$ | ∞ | $d_{30}$ | 4.0 | $N_{16}$ 1.49140 | $\nu_{16}$ | 57.9 |
| | $r_{31}$ | ∞ | $d_{31}$ | 20.1 | | | |
| $L_{15}$ | $r_{32}*$ | 20.000 | $d_{32}$ | 4.0 | $N_{17}$ 1.49140 | $\nu_{17}$ | 57.9 |
| | $r_{33}*$ | −20.000 | $d_{33}$ | 34.0 | | | |

TABLE 4-continued (Embodiment 3)
(f = 33.00)  Diopter = 0.0  Magnification = 1.94

| | | Radius of Curvature | Axial Distance | | Refractive Index | | Abbe Number |
|---|---|---|---|---|---|---|---|
| $L_{16}$ | | $r_{34}*$ 20.000 | $d_{34}$ | 4.0 | $N_{18}$ 1.49140 | $\nu_{18}$ | 57.9 |
| | | $r_{35}*$ −20.000 | $d_{35}$ | 39.0 | | | |
| $L_{17}$ | | $r_{36}*$ 20.000 | $d_{36}$ | 4.0 | $N_{19}$ 1.49140 | $\nu_{19}$ | 57.9 |
| | | $r_{37}*$ −20.000 | $d_{37}$ | 20.0 | | | |
| | | Eye Point | | | | | |

*$\epsilon = -0.95, \sum_i C_i \phi^{2i} = 0$

TABLE 5

(Embodiment 4)
(f = 33.00)  Diopter = 0.0  Magnification = 1.95

| | | Radius of Curvature | Axial Distance | | Refractive Index | | Abbe Number |
|---|---|---|---|---|---|---|---|
| $P'$ | | $r_{16}$ ∞ | $d_{16'}$ | 11.5 | $N_9$ 1.62588 | $\nu_9$ | 35.70 |
| | | $r_{17'}$ ∞ | $d_{27}$ | 18.0 | | | |
| $L_{14}$ | | $r_{28}*$ 16.000 | $d_{28}$ | 4.0 | $N_{15}$ 1.49140 | $\nu_{15}$ | 57.9 |
| | | $r_{29}$ −30.000 | $d_{29}$ | 40.1 | | | |
| $L_{15}$ | | $r_{30}$ 30.000 | $d_{30}$ | 4.0 | $N_{16}$ 1.49140 | $\nu_{16}$ | 57.9 |
| | | $r_{31}*$ −16.000 | $d_{31}$ | 41.8 | | | |
| $L_{16}$ | | $r_{32}*$ 16.000 | $d_{32}$ | 4.0 | $N_{17}$ 1.49140 | $\nu_{17}$ | 57.9 |
| | | $r_{33}$ −30.000 | $d_{33}$ | 40.1 | | | |
| $L_{17}$ | | $r_{34}$ 30.000 | $d_{34}$ | 4.0 | $N_{18}$ 1.49140 | $\nu_{18}$ | 57.9 |
| | | $r_{35}*$ −16.000 | $d_{35}$ | 20.0 | | | |
| | | Eye Point | | | | | |

*$\epsilon = -0.85, \sum_i C_i \phi^{2i} = 0$

In these embodiments, the object side part 1 ($r_1$ to $r_{15}$) of the objective lens system and the air space $d_{15}$ in the finder system are identical with those in the first embodiment, and not shown, but the branch optical system is only shown. Further, in FIGS. 4 to 6, the elements of the branch optical system are shown along a straight optical axis equivalent to the practical optical axis including reflection on mirrors. It should be noted that the embodiments in FIGS. 5 and 6 are each formed by identically shaped single lenses. Further, in case of the FIG. 5 embodiment, each single lens is symmetrically shaped. In addition, the focusing plate G having a reticle on its image side surface is located at the position of the primary real image in case of FIGS. 4 and 5 embodiments as indicated by 9'. FIGS. 11a to 11c, 12a to 12c, and 13a to 13c correspond to the second to fourth embodiments, respectively. Necessary data for the longitudinal chromatic aberration of F-line to 3-line of the second to fourth embodiments are summarized in the following table with those of the first embodiment and the exemplary prior art.

| | Object Side Part of Objective Lens System (diopter) | Whole Objective lens system (mm) | Branch Optical System (diopter) | Whole Finder System (diopter) | At Reticle of Finder System (mm) |
|---|---|---|---|---|---|
| 1st emb. | −0.43 | 0.026 | 0.55 | −0.07 | 0.030 |
| 2nd emb. | " | " | 0.78 | 0.43 | −0.043 |
| 3rd emb. | " | " | 2.17 | 1.75 | −0.043 |
| 4th emb. | " | " | 2.12 | 1.69 | — |
| Prior Art | 0.23 | −0.043 | −0.39 | −0.023 | −0.049 |

The above table discloses that a simplified branch optical system of insufficient correction of longitudinal chromatic aberration can be successfully utilized to form a high class of finder system in accordance with the present invention.

By the way, the objective lens system in FIGS. 2 and 3 are zoom lens systems, and the position in the Figures or Tables 1-L, 1-F, 2-l, and 2-F are of telephoto position. In case of wide angle photography, $d_6=0.7$, $d_{12}=17.0$, $d_{15}=7.1$ and $f=8.73$ in Table 1-L and 1-F, while $d_6-0.7$, $d_{12}=17.0$, $d_{14}-9.1$ and $f-8.74$ in Tables 2-L and 2-F. In FIGS. 2 and 3, the focusing lens group, the variator lens group, the compensator lens group, and the relay group are identified with F, V, C and R, respectively.

What is claimed is:

1. An optical system for use in single lens reflex cameras comprising:
   an objective lens system consisting of an object side part with its longitudinal chromatic aberration of F-line to d-line being overcorrected to provide a negative value in diopters, and an image side part of a positive refractive power with its longitudinal chromatic aberration of F-line to d-line being undercorrected to provide a negative value in millimeters, an image forming light path being passed through the object side and image side parts toward the image, whereby the undercorrected longitudinal chromatic aberration of the image side part is substantially cancelled with the overcorrected longitudinal chromatic aberration of the object side part;
   means for branching the image forming light path between the object side part and the image side part of the objective lens system; and
   a branch optical system of a positive refractive power with its longitudinal chromatic aberration of F-line to d-line left in an undercorrected condition, to provide a positive value in diopters, the branch optical system receiving the branched light path to form a finder system in combination with the object side part of the objective lens system, whereby the undercorrected longitudinal chromatic aberration of the branch optical system is predetermined in a complimentary manner to be substantially cancelled by the overcorrected longitudinal chromatic aberration of the object side part of the objective lens system.

2. The invention of claim 1, wherein the absolute value of the overcorrected longitudinal chromatic aberration of the object side part of the objective lens system is over 0.3 diopter in terms of finder.

3. The invention of claim 1, wherein the branched light path receiving optical system includes at least one lens element having at least one aspherical surface.

4. The invention of claim 3, wherein the branched light path receiving optical system includes, from the object to eye side, a front lens group consisting of a doublet, an intermediate lens group consisting of a pair of single lenses, and a rear lens group consisting of a doublet.

5. The invention of claim 4, wherein the pair of single lenses in the intermediate lens group are identically shaped lenses formed by symmetric aspherical surfaces.

6. The invention of claim 4, wherein the branched light path receiving optical system further includes a focusing plate located between the intermediate and rear lens groups.

7. The invention of claim 3, wherein all the optical elements, which share refractive powers of the branched light path receiving optical system, consist of identically shaped single lenses.

8. The invention of claim 7, wherein each of the optical elements is symmetrically shaped.

9. The invention of claim 3, wherein the branched light path receiving optical system includes, from the object to eye side, a front lens group consisting of a single lens, an intermediate lens group, and a rear lens group consisting of a single lens identically shaped with the single lens in the front lens group.

10. The invention of claim 9, wherein the intermediate lens group consists of a doublet.

11. The invention of claim 1, wherein the object side part of the objective lens system includes at least one movable lens group for zooming operation.

12. The invention of claim 11, wherein the object side part of the objective lens system includes, from the object to image side, a focusing lens group, variator lens group and a compensator lens group.

13. The invention of claim 12, wherein the compensator lens group includes a doublet for causing the overly corrected longitudinal chromatic aberration.

14. An optical system for use in single lens reflex cameras comprising:
an object lens system including an object side part and an image side part, an image forming light path being passed through the object side and image side parts toward the image;
means for branching the image forming light path between the object side part and the image side part of the objective lens system; and
a branch optical system for receiving the branched light path to form a finder system in combination with the object side part of the objective lens system,
wherein, the image side part of the object lens system and the branch optical system each have a positive refractive power and correspondingly an inherent longitudinal chromatic aberration, the inherent aberration being left in an undercorrected condition to simplify both the lens construction of the image side part of the objective lens system with its longitudinal chromatic aberration of F-line to d-line represented by a negative value in milliters and the branch optical system with its longitudinal chromatic aberration of F-line to d-line represented by a positive value in diopters and wherein the object side part of the objective lens system has an overcorrected longitudinal chromatic aberration of F-line to d-line represented by a negative value in diopters, which is opposite to the inherent aberration of the image side part of the object lens system and the branch optical system to cancel them with it, whereby, the whole lens construction of the optical system for use in single lens reflex cameras is simplified with the correction of the longitudinal chromatic aberration achieved.

15. A combination objective lens system and viewfinder wherein the objective lens system transmits an image with significant aberration to the viewfinder, the viewfinder capable of correcting the aberration and being defined as follows;

| | | (f = 33.00) | Diopter = 0.0 | | Magnification = 1.75 | |
|---|---|---|---|---|---|---|
| | | Radius of Curvature | Axial Distance | | Refractive Index | Abbe Number |
| P' | ( | $r_{16}$ ∞ | $d_{16'}$ | 11.5 | $N_9$ 1.62588 $\nu_9$ | 35.70 |
| | | $r_{17'}$ ∞ | $d_{27}$ | 22.0 | | |
| $L_{14}$ | ( | $r_{28*}$ 20.000 | $d_{28}$ | 4.0 | $N_{15}$ 1.49140 $\nu_{15}$ | 57.9 |
| | | $r_{29*}$ −20.000 | $d_{29}$ | 17.0 | | |
| G | ( | $r_{30}$ ∞ | $d_{30}$ | 4.0 | $N_{16}$ 1.49140 $\nu_{16}$ | 57.9 |
| | | $r_{31}$ ∞ | $d_{31}$ | 58.0 | | |
| $L_{15}$ | ( | $r_{32}$ 27.000 | $d_{32}$ | 3.0 | $N_{17}$ 1.61762 $\nu_{17}$ | 52.70 |
| $L_{16}$ | | $r_{33}$ −10.700 | $d_{33}$ | 1.0 | $N_{18}$ 1.73300 $\nu_{18}$ | 28.24 |
| | | $r_{34}$ −30.000 | $d_{34}$ | 71.3 | | |
| $L_{17}$ | ( | $r_{35*}$ 20.000 | $d_{35}$ | 4.0 | $N_{19}$ 1.49140 $\nu_{19}$ | 57.9 |
| | | $r_{36*}$ −20.000 | $d_{36}$ | 27.0 | | |
| | | Eye Point | | | | |

*$\epsilon = -1.25$, $\sum_i C_i \phi^{2i} = 0$ wherein p', $L_{14}$, G, $L_{15}$, $L_{16}$, and $L_{17}$ represent elements in the viewfinder lens system and $r_{x*}$ represents aspherical surfaces.

16. An improved optical system for use in a camera having a primary object lens system for forming an image on a recording member and a secondary viewfinder lens system for observing the object scene to be recorded, comprising:
at least one first lens group common to the primary objective lens system and to the secondary viewfinder lens system with a predetermined overcorrection of longitudinal chromatic aberration of F-line to d-line represented by a negative value in diopters;
a second relay lens group optically aligned with the first lens group for transmitting an image of the object scene to the recording member, the second relay lens has a chromatic aberration of negative value in millimeters, the absolute value of which is greater than $0.0004 f_R$ for the F-line to d-line to compensate the overcorrection of the first lens group and to provide an acceptable image resolution;
a third viewfinder relay lens group on the image side of the first lens group for transmitting an image of the object scene to a viewer, the third viewfinder relay lens group has a predetermined undercorrection of longitudinal chromatic aberration of F-line to d-line represented by a positive value in diopters to compensate the overcorrection of the first lens group and to provide an acceptable image to the viewer, and
means for optically transmitting an image forming light path to the third viewfinder relay lens system, wherein $f_r$ represents the focal length of the second relay lens group.

17. The invention of claim 16 wherein the absolute value of the overcorrected longitudinal chromatic aberration of the first lens group is over 0.3 diopter in terms of the viewfinder.

18. The invention of claim 16 wherein the light path receiving viewfinder relay lens system includes at least one lens element having at least one aspherical surface.

19. An improved optical system for use in a camera having a primary objective lens system for forming an image on a recording member and a secondary viewfinder lens system for observing the object scene to be recorded, comprising:

at least one first lens group common to the primary objective lens system and to the secondary viewfinder lens system with a predetermined overcorrection of longitudinal chromatic aberration of F-line to d-line to provide a negative diopter value;

a second relay lens group optically aligned with the first lens group for transmitting an image of the object scene to the recording member, the second relay lens has a predetermined undercorrection of longitudinal chromatic aberration so that the aberration of the F-line to d-line is of a negative value in millimeters, in order to match the overcorrection of the first lens group and to provide an acceptable image resolution;

a third viewfinder relay lens group on the image side fo the first lens group for transmitting an image of the object scene to a viewer, the third viewfinder relay lens group has a predetermined undercorrection of longitudinal chromatic aberration of F-line to d-line to provide an acceptable image to the viewer, and means for optically transmitting an image forming light path to the third viewfinder relay lens system.

* * * * *